United States Patent [19]

Daimaru

[11] Patent Number: 4,938,905
[45] Date of Patent: Jul. 3, 1990

[54] METHOD OF CONTROLLING THE ORIENTATION OF SHORT FIBERS IN A SHORT FIBER-REINFORCED ARTICLE

[75] Inventor: Akimasa Daimaru, Saitama, Japan

[73] Assignee: Honda Giken Kogyo Kabushiki Kaisha, Tokyo, Japan

[21] Appl. No.: 298,658

[22] Filed: Jan. 18, 1989

[30] Foreign Application Priority Data

Jan. 18, 1988 [JP] Japan ................................. 63-8177

[51] Int. Cl.$^5$ ............................................. B29C 55/02
[52] U.S. Cl. .................................... 264/108; 264/172; 264/288.4
[58] Field of Search ...................... 264/108, 172, 288.4, 264/288.8, 289.6, 290.2

[56] References Cited

U.S. PATENT DOCUMENTS

| 3,064,391 | 11/1962 | Devol | 264/108 X |
| 3,869,430 | 3/1975 | Blades | 264/184 X |
| 4,514,459 | 4/1985 | Nakagawa et al. | 428/229 |
| 4,622,265 | 11/1986 | Yoon et al. | 428/364 |
| 4,671,950 | 6/1987 | Ogawa et al. | 264/29.2 X |

Primary Examiner—Jeffery Thurlow
Assistant Examiner—Leo B. Tentoni
Attorney, Agent, or Firm—Lyon & Lyon

[57] ABSTRACT

A method for controlling the orientation of short fibers in a short fiber shaped article of composite materials, wherein the short fiber article shaped from a mixture of short fibers and solvent is subjected to a drawing treatment to control the average angle of orientation of the short fibers according to a draw ratio.

6 Claims, 4 Drawing Sheets

METHOD OF CONTROLLING THE ORIENTATION OF SHORT FIBERS IN A SHORT FIBER-REINFORCED ARTICLE

BACKGROUND OF THE INVENTION

1. Field of the Invention

The present invention relates to a method for controlling the orientation of short fibers in a short fiber-reinforced article or body which is formed from a mixture of short fibers (including, e.g., whisker) and solvent (including, e.g., organic binder, inorganic binder and water).

2. Description of the Prior Art

Attempts have been made previously to orientate short fibers and thus their fiber axes in a given direction in a short fiber shaped article or body for effective fiber-reinforcement of the composite material, and known orientating methods include using extrusion or rolling (see Japanese Patent Publication No. 1561/75) and one employing magnetism (see Japanese Patent Application Laid-open No. 95909/73).

However, the former method is to mechanically orientate a short fiber by use of dies or the like and hence, is accompanied by the following problems. It is possible to provide the orientation of the short fiber parallel to an extruding direction, but it is impossible to effect a control to incline the short fiber relative to the extruding direction or the like. Moreover, the short fiber is liable to be folded and damaged. In addition, although it is possible by using magnetism to orientate the short fiber in a surface layer of the short fiber shaped body which comes into contact with the dies or the like, it is difficult to orientate the short fiber present in the interior of the short fiber shaped body. On the other hand, the latter method is also accompanied by the problems that it is difficult to effect the aforesaid control, it is not suitable for a short fiber having no magnetic properties, and its extent of application is limited.

SUMMARY OF THE INVENTION

It is therefore an object of the present invention to provide a method for controlling the orientation of a short fiber as described above, in which the above problems associated with the prior art can be overcome.

A feature of the present invention is that a short fiber shaped body obtained from a mixture of short fiber and a solvent is subjected to a drawing treatment to control the average angle of orientation of the short fiber according to a draw ratio.

Another feature of the present invention is that a blank for a short fiber-reinforced composite material shaped from a mixture of short fibers and a matrix is subjected to a drawing treatment to control the average angle of orientation of the short fibers according to a draw ratio.

According to the present invention, the orientation of the short fibers can be carried out by subjecting the short fiber shaped body or the like to a drawing treatment and the average angle of orientation can be controlled by suitably adjusting the draw ratio.

A further feature of the present invention is that a short fiber-reinforced composite material made of short fibers and a matrix is subjected to a drawing treatment to control the average angle of orientation of the short fiber according to a draw ratio.

The draw ratio "Dr" is represented by a ratio of the cross sectional area "A1" of the short fiber shaped body, the blank or the composite material before being subjected to drawing with respect to the cross sectional area A2 thereof after subjected to drawing, i.e., by an equation: $Dr = A1/A2$.

If the orientation of the short fibers in a drawing direction is represented in terms of the average angle of inclination of a fiber axis with respect to an axis parallel to the drawing direction, i.e., the average angle of orientation thereof, there is established an interrelation between the draw ratio and the average angle of orientation under given conditions such as quality and viscosity of the binder or matrix.

Also, according to the present invention, the short fibers can be orientated in a drawing direction with the folded loss suppressed at minimum by employing an extremely simple method comprising subjecting the short fiber shaped body and the like to a drawing treatment.

In addition, the type of fibers is not critical in providing the orientation and hence, the method of the present invention is widely applicable to the short fiber shaped bodies made by use of various short fibers.

Further, the average angle of orientation can be easily controlled according to the draw ratio, and moreover, a three-dimensional orientation is also possible.

The above and other objects, features and advantages of the invention will become apparent from a reading of the following description of the preferred embodiment taken in conjunction with the accompanying drawings.

DESCRIPTION OF THE PREFERRED EMBODIMENTS

EXAMPLE I

The first description will be of an embodiment wherein the control of orientation of the short fibers is in a tape as a short fiber shaped body form.

Figure 1:
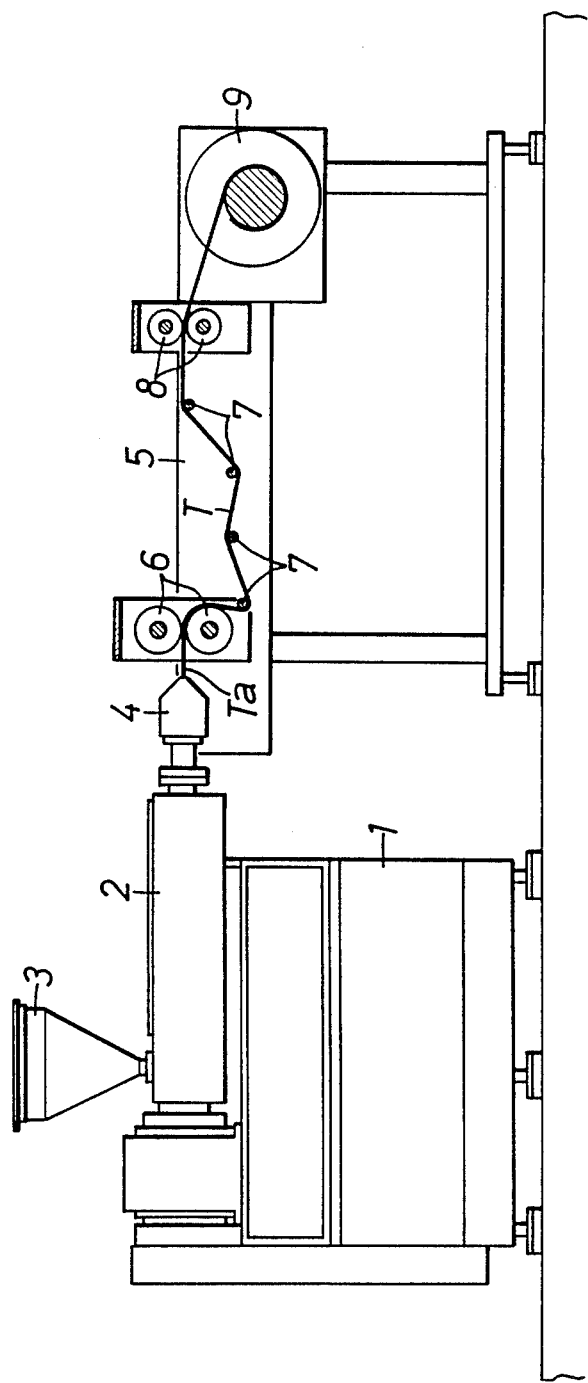
FIG. 1 is a front view of an extruder.

FIG. 1 illustrates a tape forming extruder including a cylindrical barrel 2 which is horizontally disposed above a machine body 1 and has a rotary screw provided therein. A material feeding hopper 3 is mounted on a rear portion of the cylindrical barrel 2, and a die 4 is mounted at a front end of the barrel 2. Supported on a support frame 5 located in front of the die 4 are a pair of variable-speed tension rollers 6, a plurality of relay rollers 7, a pair of feed rollers 8, and a take-up reel 9, these components being disposed in sequence from the die 4 side. An extruding opening of the die 4 is set, for example, to be 3 mm in length and 5 mm in width.

In forming the tape, SiC whiskers (such as one made by Tokai Carbon, Co., under a trade name of Tokawhisker) as a short fiber are added to polyethylene having a molecular weight of 5,000 (made by Taiyo Kasei Co., under a trade name of Sanwax 161P) as a binder so that a resultant tape will have a fiber volume fraction (Vf) of 20%. The resulting mixture is placed in a kneader preheated to about 130° C. and kneaded until it is homogeneous, thereby providing a pellet material.

The pellet material is placed in the hopper 3, and a tape blank Ta is extruded from the die 4 at a forming temperature of 130° C. and is fed between the pair of tension rollers 6. In this case, because the pair of tension rollers 6 are rotating at a speed higher than that of extrusion of the tape blank Ta, the latter is drawn in an extruding direction and subjected to a monoaxial drawing treatment, thus forming a tape T. The tape T is passed through the plurality of relay rollers 7 and the pair of feed rollers 8 and wound around the take-up reel 9.

Figure 2:
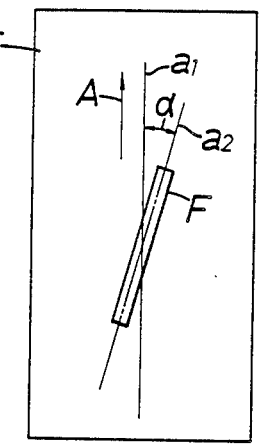
FIG. 2 is a diagram for explaining the average angle of orientation of a short fiber.

In the above tape forming operation, the speed of the pair of tension rollers 6 was varied to various levels to vary the draw ratio of the tape T for determining an average angle $\alpha$ of orientation for the SiC whisker F, as shown in FIG. 2. This provided the results given in Table I. In FIG. 2, a1 is the axis parallel to a drawing direction A, and a2 is the axis of the fiber. Accordingly, the average angle $\alpha$ of orientation is an average angle of inclination of the SiC whisker F and its fiber axis a2.

TABLE I

| Tape No. | Draw Ratio | Average Angle of Orientation ($\alpha$) |
|---|---|---|
| 1 | 1.0 | 45° (random orientation) |
| 2 | 1.10 | 32° |
| 3 | 1.21 | 16° |
| 4 | 1.44 | 10° |
| 5 | 2.25 | 8° |

Figure 3:
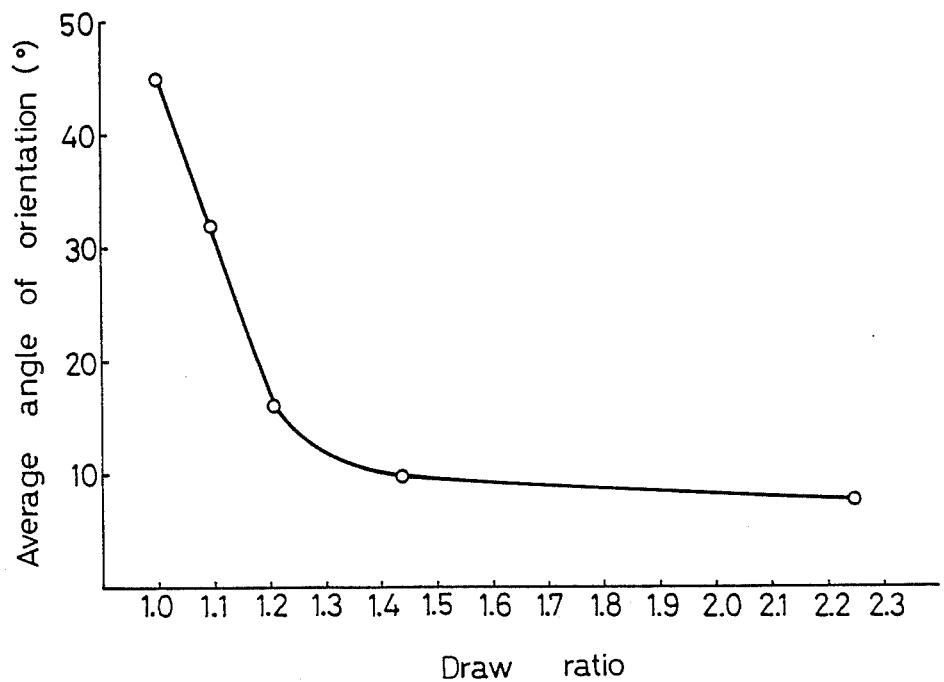
FIG. 3 is a graph illustrating a relationship between the draw ratio and the average angle of orientation.

FIG. 3 is drawn on the basis of Table I, and it can be seen from Table I and FIG. 3 that the average angle of orientation $\alpha$ decreases as the draw ratio increases.

In order to produce a laminate body, eight tapes formed in accordance with No. 1 in Table I were superposed one on another and the superposed material was subjected to a pressing treatment under conditions of 0.1 Torr and 110° C. Then, the laminate body was placed into a heating oven where the polyethylene component was removed under a condition of 400° C. or less, thereby providing a reinforcing material for short fiber-reinforced reinforced articles. A reinforcing material is also obtained using a laminated material resulting from superposition of twelve tapes formed in accordance with No. 5 of Table I in the same manner.

Using the above reinforcing materials, two short fiber-reinforced aluminum alloy plates were produced by utilizing a pressure casting process under conditions given in Table II.

TABLE II

| Matrix | Aluminum alloy (JIS AC4C) |
|---|---|
| Temperature of molten metal | 740° C. |
| Pressing force | 800 kg/cm² |
| Temperature and time of pre-heating of reinforcing material | 700° C. 20 minutes |

The above-described short fiber-reinforced aluminum alloy plates were subjected to a tensile test to provide the results given in Table III. The tensile test was carried out by producing JIS No. 8B test pieces from the individual short fiber-reinforced aluminum alloy plates and testing them according to JIS Z2241. In Table III, the both short fiber-reinforced aluminum alloy plates are identified by the tape numbers shown in Table I.

TABLE III

| Tape No. | Young's Modulus (kg/mm²) |
|---|---|
| 1 | 9,800 |
| 5 | 12,000 |

It can be can seen from Tables I and III that the smaller the average angle $\alpha$ of orientation of the SiC whisker, the larger the strength and rigidity of the short fiber-reinforced aluminum alloy plates.

Figure 4A:
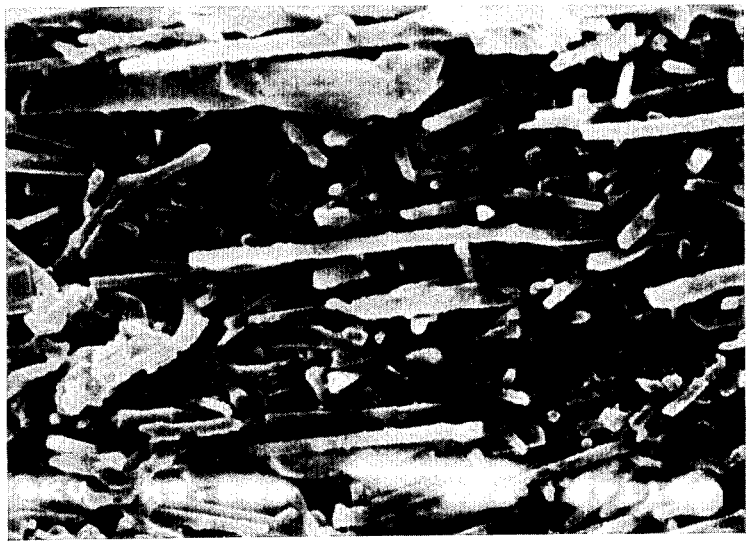
FIG. 4(a) and (b) are microphotographs showing a metallographical structure of a fiber-reinforced aluminum alloy, FIG. 4(a) showing a longitudinal section and FIG. 4(b) showing a cross section.
Figure 4B:
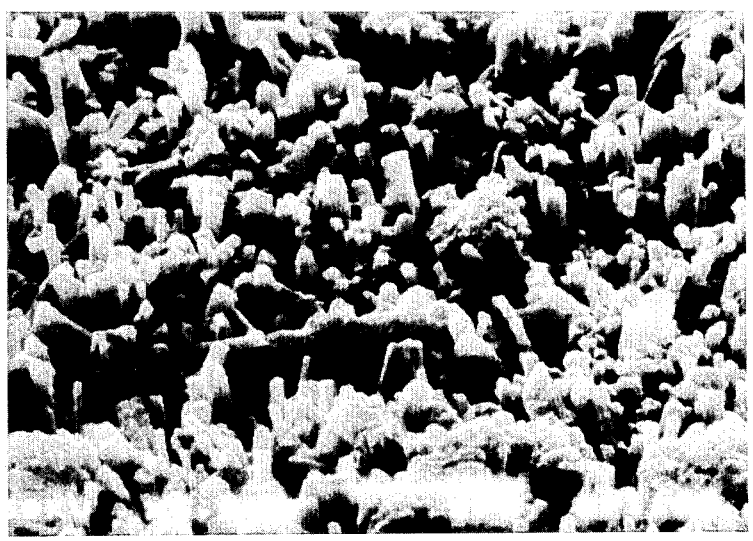

FIGS. 4(a) and 4(b) are photographs taken by a scanning electron microscope (SEM) showing the metallographic structure in the fiber-reinforced aluminum alloy plate produced by use of the No. 5 tape, FIG. 4(a) showing a longitudinal section and FIG. 4(b) showing a cross section. As apparent from these photographs, the folded loss of the SiC whiskers is smaller. For example, if the extent of folded loss is represented by l/d wherein d is the diameter of the SiC whiskers and l is the length thereof, l/d=18 approximately is established for the plate shown in FIGS. 4(a) and 4(b), but when the prior art extruding process using a die is applied, there is a value of l/d=5 to 10, indicating that the folded loss of the SiC whiskers is larger. In addition, the disturbance of orientation of the SiC whiskers is also less.

Figure 5:
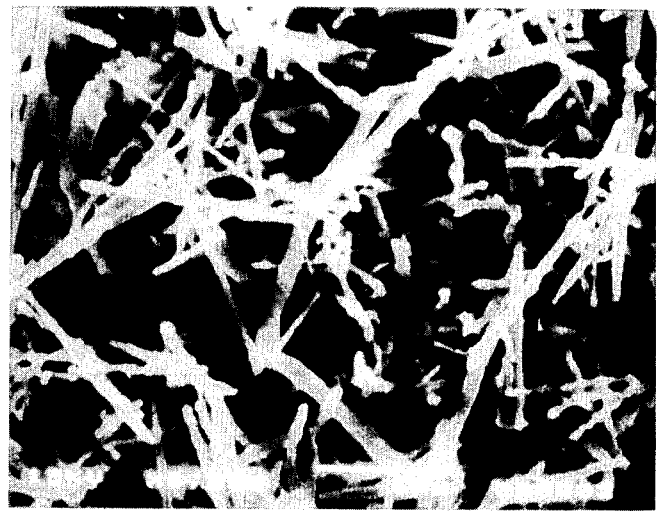
FIG. 5 is a microphotograph showing a metallographical structure of another fiber-reinforced aluminum alloy, similar to FIG. 4(a).

FIG. 5 is a microphotograph taken by a scanning electron microscope showing a metallographical structure in the fiber-reinforced aluminum alloy plate produced by use of the No. 1 tape of Table I, and it can be seen from the microphotograph that the SiC whisker is oriented at random.

EXAMPLE II

The invention will now be described in connection with controlling the orientation of short fibers in a plate-like blank as a short fiber-reinforced composite material blank.

A mixture of the following composition was placed in a kneader preheated to about 130° C. and kneaded until it was homogeneous, thereby giving a pellet material.

| | |
|---|---|
| Matrix Aluminum alloy powder having an average diameter of 20 μm (AA specification 6061, powder produced by an atomizing process) | 42% by volume |
| Short Fibers SiC fiber having an average diameter of 4.5 μm and an average length of 110 μm | 15% by volume |
| Binder (the above-described Sanwax 161P) | 35% by volume |
| Lubricant Stearic acid | 8% by volume |

The die 4 of the above-described extruder of FIG. 1 was replaced with another die for forming plate shape and the above material was placed in the hopper 3 and subjected to an extrusion forming at a forming temperature of 130° C., followed by a monoaxial drawing treatment by the tension rollers 6 to provide a plate-like blank.

In this case, two plate-like blanks Nos. 1 and 2 were formed with draw ratios set at 1.0 and 4.0, and the average angle $\alpha$ of orientation of the SiC fibers was determined to provide the results given in Table IV.

TABLE IV

| Plate-Like Blank No. | Draw Ratio | Average angle of orientation ($\alpha$) |
|---|---|---|
| 1 | 1.0 | 45° (Random orientation) |

TABLE IV-continued

| Plate-Like Blank No. | Draw Ratio | Average angle of orientation (α) |
| --- | --- | --- |
| 2 | 4.0 | 15° |

Employing the heating oven used in Example I, the above plate-like blanks were subjected to a binder-removing treatment under a condition of 400° C. or less and then to an HIP treatment (hot/hydrostatic treatment) under conditions of a temperature of 500° to 600° C. and a pressure of 3,000 to 5,000 kg/cm² to produce two short fiber-reinforced aluminum alloy plates.

The above short fiber-reinforced aluminum alloy plates were subjected to a tensile test to provide the results given in Table V. The tensile test was carried out in the same manner as in Example I. In Table V, the both short fiber-reinforced aluminum alloy plates are identified by the Blank Numbers given in Table IV.

TABLE V

| Plate-Like Blank No. | Young's Modulus (kg/mm²) |
| --- | --- |
| 1 | 9,650 |
| 2 | 11,200 |

EXAMPLE III

The invention will now be described in connection with controlling the orientation of short fibers in a plate material as a short fiber-reinforced composite material.

First, two plate-like fiber shaped bodies having a fiber volume fraction (Vf) of 20% were produced employing a SiC fiber having an average diameter of 45.5 μm and an average length of 110 μm and utilizing a vacuum deposition process.

Using the above shaped bodies, two plate materials made of short fiber-reinforced aluminum alloy were produced by utilizing a pressure casting process under the same condition as that shown in Table II of the Example I.

These plate materials were heated and drawn at a temperature 50° C. lower than their melting temperature. In this case, the draw ratio for plate material No. 1 was set at 1.0, while that for plate material No. 2 was set at 4.0. The average angles (α) of orientation and the results of the tensile tests for the plate materials Nos. 1 and 2 after drawing are as given in Table VI. The tensile tests were carried out in the same manner as in Example I.

TABLE VI

| Plate material No. | Average angle (α) | Young's modulus (kg/mm²) |
| --- | --- | --- |
| 1 | 45° (random orientation) | 9,800 |
| 2 | 10° | 11,700 |

It will be understood that the drawing treatment is not limited to the monoaxial drawing, and a multi-axial drawing can be employed to provide a three-dimensional orientation of the short fibers, and a synthetic resin can also be used as a matrix.

What is claimed is:

1. A method for controlling orientation of short fibers in a short fiber shaped body of composite materials including short fibers in a mixture with a solvent, comprising the step of subjecting the short fiber shaped body to a drawing treatment to control and set an average angle of orientation of the short fibers with respect to a drawing direction at a desired value by varying a draw ratio.

2. A method for controlling orientation of a short fiber in a blank for a short fiber-reinforced composite material, wherein the blank shaped from a mixture of short fiber and matrix is subjected to a drawing treatment to control and set an average angle of orientation of the short fiber with respect to a drawing direction at a desired value by varying a draw ratio.

3. A method for controlling orientation of a short fiber in a short fiber-reinforced composite material wherein the short fiber-reinforced composite material made of short fiber and matrix is subjected to a drawing treatment to control and set an average angle of orientation of the short fiber with respect to a drawing direction at a desired value by varying a draw ratio.

4. A method for controlling orientation of short fibers in a short fiber-reinforced article, comprising, forming an intermediate article with randomly disposed short fibers, and subjecting said intermediate article to a drawing treatment for causing the short fibers to assume on an average a smaller, desired angle of inclination to the direction in which the drawing treatment is performing by varying a draw ratio.

5. The method of claims 1, 2, 3 or 4 wherein said drawing treatment is performed at an elevated temperature.

6. The method of claim 4 wherein the draw ratio is increased for reducing the angle of inclination.

* * * * *